(12) United States Patent
Li

(10) Patent No.: US 7,285,751 B2
(45) Date of Patent: Oct. 23, 2007

(54) AUTOMATIC ELECTRIC MUFFIN MAKER

(76) Inventor: George T. C. Li, 2533 N. Carson St., Suite #098, Carson City, NV (US) 89706

( * ) Notice: Subject to any disclaimer, the term of this patent is extended or adjusted under 35 U.S.C. 154(b) by 0 days.

(21) Appl. No.: 10/934,255

(22) Filed: Sep. 7, 2004

(65) Prior Publication Data

US 2006/0049165 A1    Mar. 9, 2006

(51) Int. Cl.
*A47J 37/00* (2006.01)
*A47J 37/01* (2006.01)
*H05B 3/06* (2006.01)
*H05B 3/68* (2006.01)

(52) U.S. Cl. ............ 219/386; 219/408; 219/409; 219/411; 219/524; 99/374; 99/376

(58) Field of Classification Search ............ None
See application file for complete search history.

(56) References Cited

U.S. PATENT DOCUMENTS

| | | | | |
|---|---|---|---|---|
| 1,587,788 A | * | 6/1926 | Morley | 99/376 |
| 1,966,410 A | * | 7/1934 | Kaufmann | 219/400 |
| 2,666,380 A | * | 1/1954 | Badenoch | 99/329 R |
| 2,693,750 A | * | 11/1954 | Badenoch | 99/329 R |
| 2,791,960 A | * | 5/1957 | Pietropinto | 99/439 |
| 3,669,006 A | * | 6/1972 | Lee, Sr. | 99/450.3 |
| 4,054,086 A | * | 10/1977 | McNair | 99/374 |
| 4,817,513 A | | 4/1989 | Carbon et al. | 99/383 |
| 4,970,949 A | | 11/1990 | Ferrara, Jr. et al. | 99/374 |
| 5,255,595 A | * | 10/1993 | Higgins | 99/378 |
| 5,613,426 A | * | 3/1997 | Chan Gabbai | 99/375 |
| 6,247,392 B1 | * | 6/2001 | Yung | 99/340 |
| 6,369,366 B1 | * | 4/2002 | Mullen | 219/450.1 |
| 6,429,409 B1 | * | 8/2002 | Siu | 219/450.1 |
| 6,593,552 B1 | * | 7/2003 | Li | 219/432 |
| 2004/0217109 A1 | * | 11/2004 | Chang | 219/525 |

* cited by examiner

*Primary Examiner*—Joseph M. Pelham
(74) *Attorney, Agent, or Firm*—Clifford F. Rey

(57) ABSTRACT

An automatic electric muffin maker for baking muffins and related foodstuffs is disclosed. The present muffin maker comprises a housing assembly enclosing a bottom heating plate having an integrated heating element and a top heating element for browning (i.e. to scorch slightly in cooking). Advantageously, the heating plate includes a plurality of integrally formed, internally tapered heating wells which receive a mating baking pan having tapered cylindrical mold cups configured to provide complementary surface-to-surface engagement within the heating wells and efficient heat transfer therebetween. The heating elements are electrically interconnected to a heat control thermostat, which regulates the baking cycle. In an alternative embodiment the baking functions are carried out by electronic controls including a timed cooking cycle which changes to a warming mode upon completion.

15 Claims, 11 Drawing Sheets

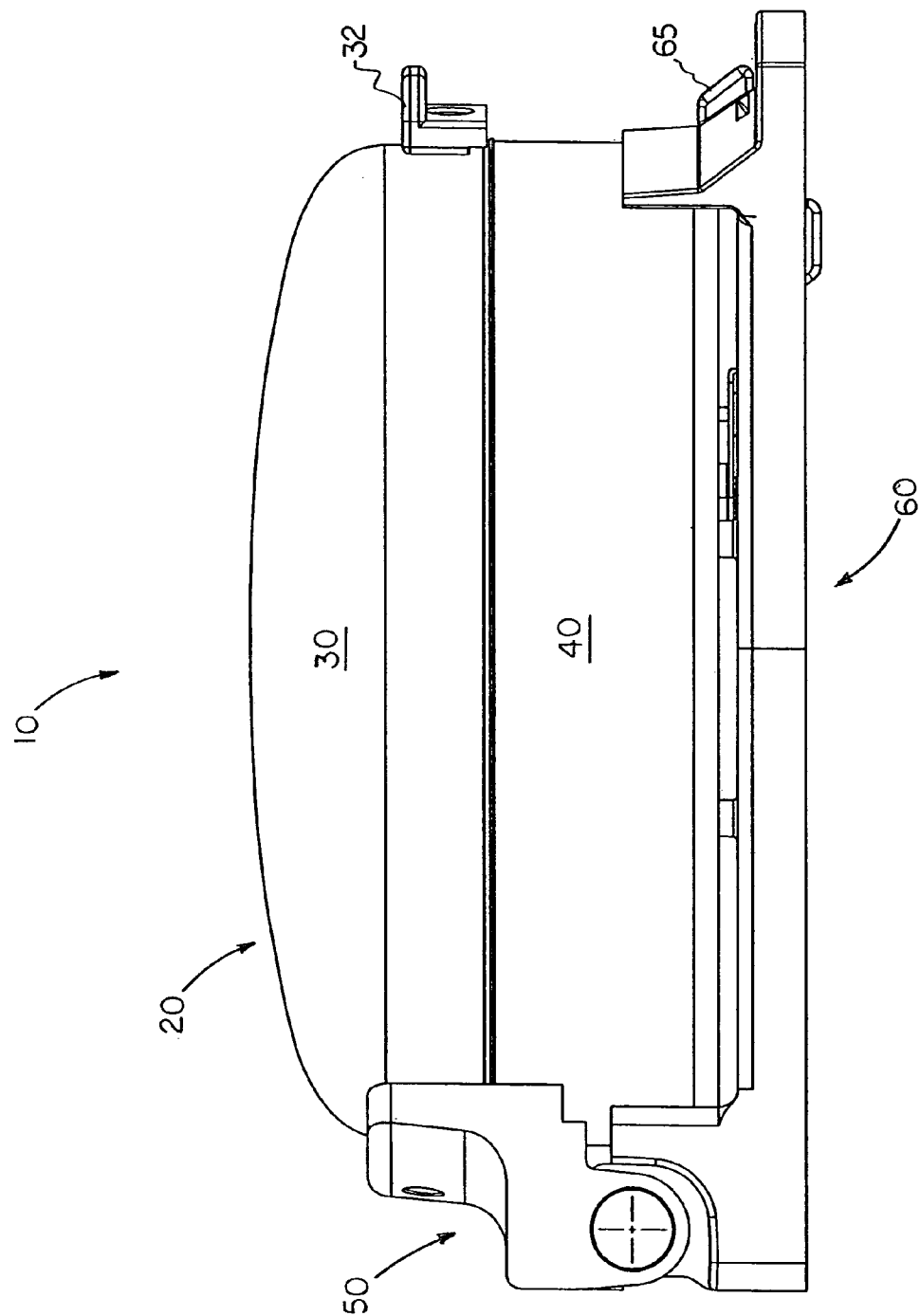

AUTOMATIC ELECTRIC MUFFIN MAKER

BACKGROUND OF INVENTION

The present invention relates to home cooking appliances and, more particularly, to an automatic electric muffin maker for baking muffins and related foodstuffs.

Batch type appliances for baking foodstuffs from batter are known in the prior art. One example of such an appliance is disclosed in U.S. Pat. No. 4,970,949 to Ferrara, Jr. et al. which provides a batch baker comprising a compact oven for baking breads, muffins and other baked items of a general disc shape. This device includes a housing in which a lower cooking cavity having a plurality of alternating vertically aligned disk-shaped members and semicircular troughs for receiving batter is disposed. A serpentine heating element is configured to pass between adjacent troughs such that heat may be applied to each disc face, which defines the vertical sides of the muffin.

Another example of a batch type appliance for baking comestibles from batter is disclosed in U.S. Pat. No. 4,817,513 to Carbon provides a cone baker including a mold assembly and a core assembly which are pivotally connected to a frame. Heating elements are positioned in the mold and the core assemblies to heat batter, which is poured into the mold cavity to form the cone or related food item of a tapered cylindrical shape.

While these devices fulfill their respective, particular objectives and requirements, the aforementioned patents differ significantly in their construction from the present invention and do not disclose the features of the present automatic muffin maker.

SUMMARY OF THE INVENTION

Accordingly, the present invention provides a home appliance for baking breads, muffins, and related foodstuffs. The present automatic muffin maker comprises a hinged housing assembly enclosing a bottom heating plate having a heating element integrated therein and a top heating element for browning (i.e. to scorch slightly in cooking). Advantageously, the heating plate includes a plurality of integrally formed heating wells which receive a baking liner including a plurality of muffin mold cups formed therein that is configured to provide complementary surface-to-surface engagement within the heating wells to provide efficient heat transfer therebetween. A heat controller or thermostat is electrically interconnected to the heating elements to regulate the baking functions of the present device.

There has thus been outlined, rather broadly, the important features of the invention in order that the detailed description thereof that follows may be better understood, and in order that the present contribution to the art may be better appreciated. There are additional features of the invention that will be described hereinafter and which will form the subject matter of the claims appended hereto.

Other features and technical advantages of the present invention will become apparent from a study of the following description and the accompanying drawings.

BRIEF DESCRIPTION OF THE DRAWINGS

The novel features of the present invention are set forth in the appended claims. The invention itself, however, as well as other features and advantages thereof will be best understood by reference to the following detailed description of an illustrative embodiment when read in conjunction with the accompanying figures wherein:

FIG. 2 is a side elevation of the present muffin maker;

DETAILED DESCRIPTION OF THE PREFERRED EMBODIMENTS

Figure 1A:
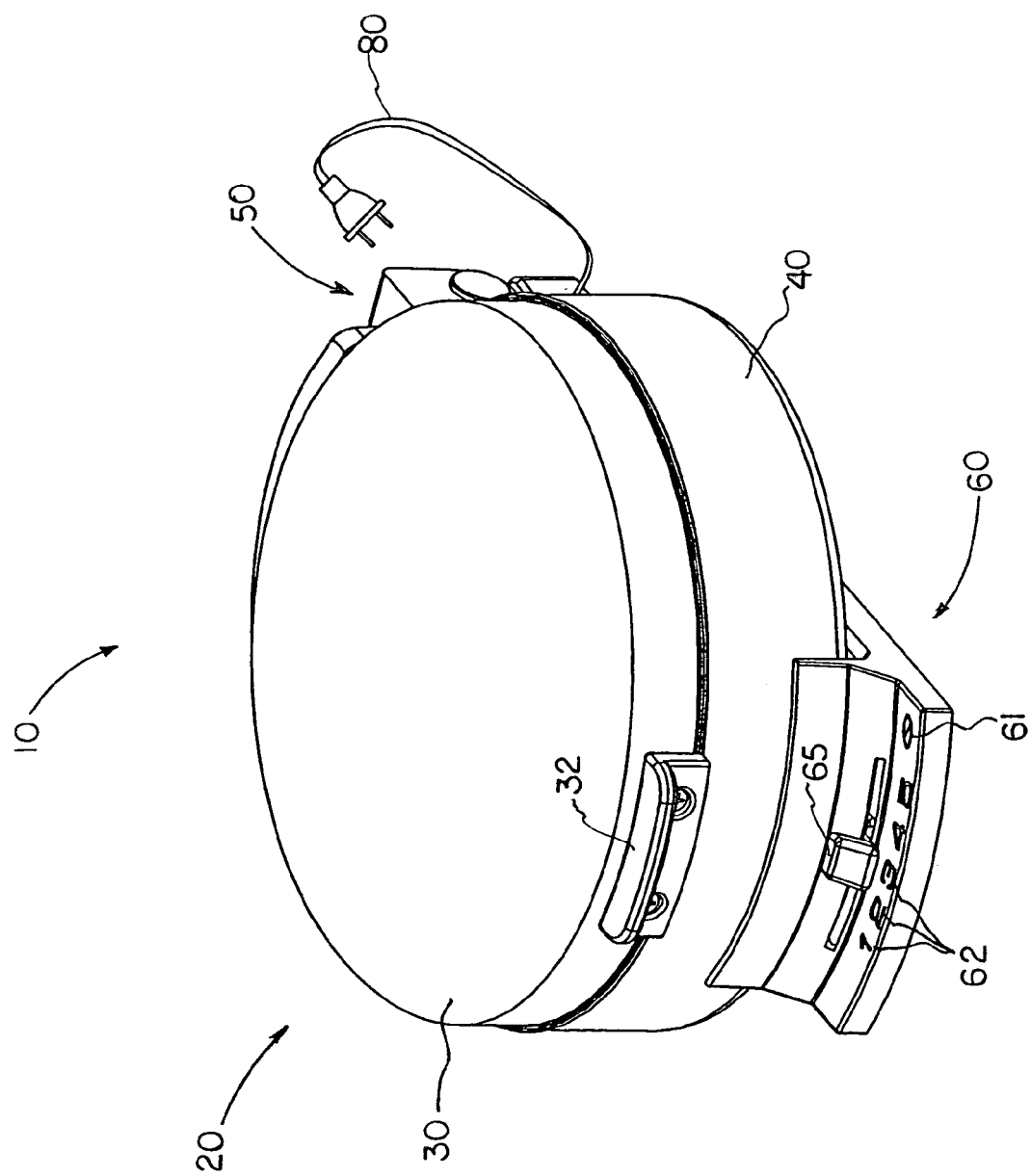
FIG. 1A is a perspective view of the present automatic muffin maker.
Figure 1B:
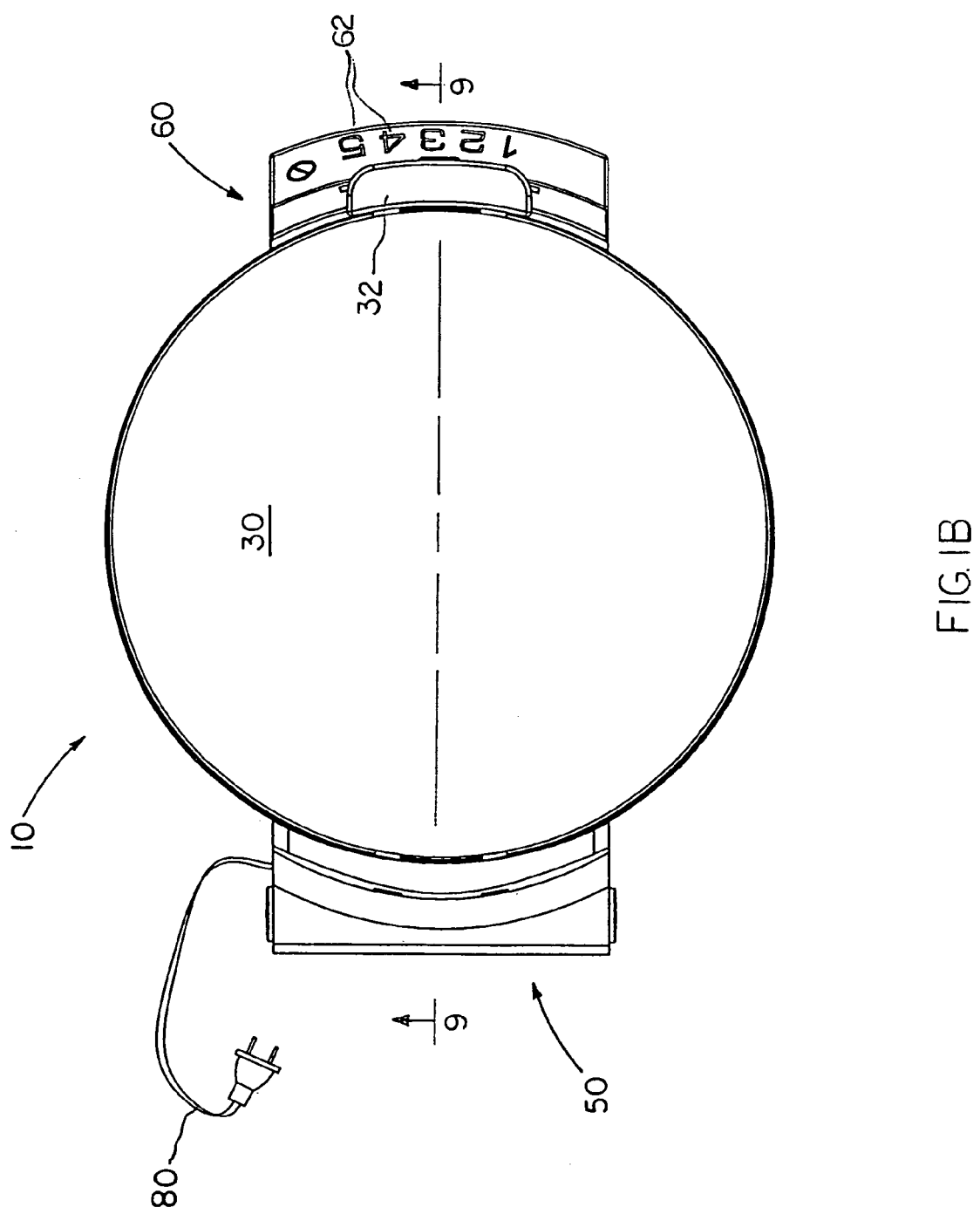
FIG. 1B is a top plan view of the present muffin maker showing the orientation of section plane 8-8.

With further reference to the drawings, there is shown therein an automatic muffin maker in accordance with the present invention, indicated generally at 10 and illustrated in FIGS. 1A and 1B. The present muffin maker 10 is comprised of a housing assembly, indicated generally at 20 including an upper housing section or lid member 30 having a handle 32 and a lower housing section 40.

Figure 3:
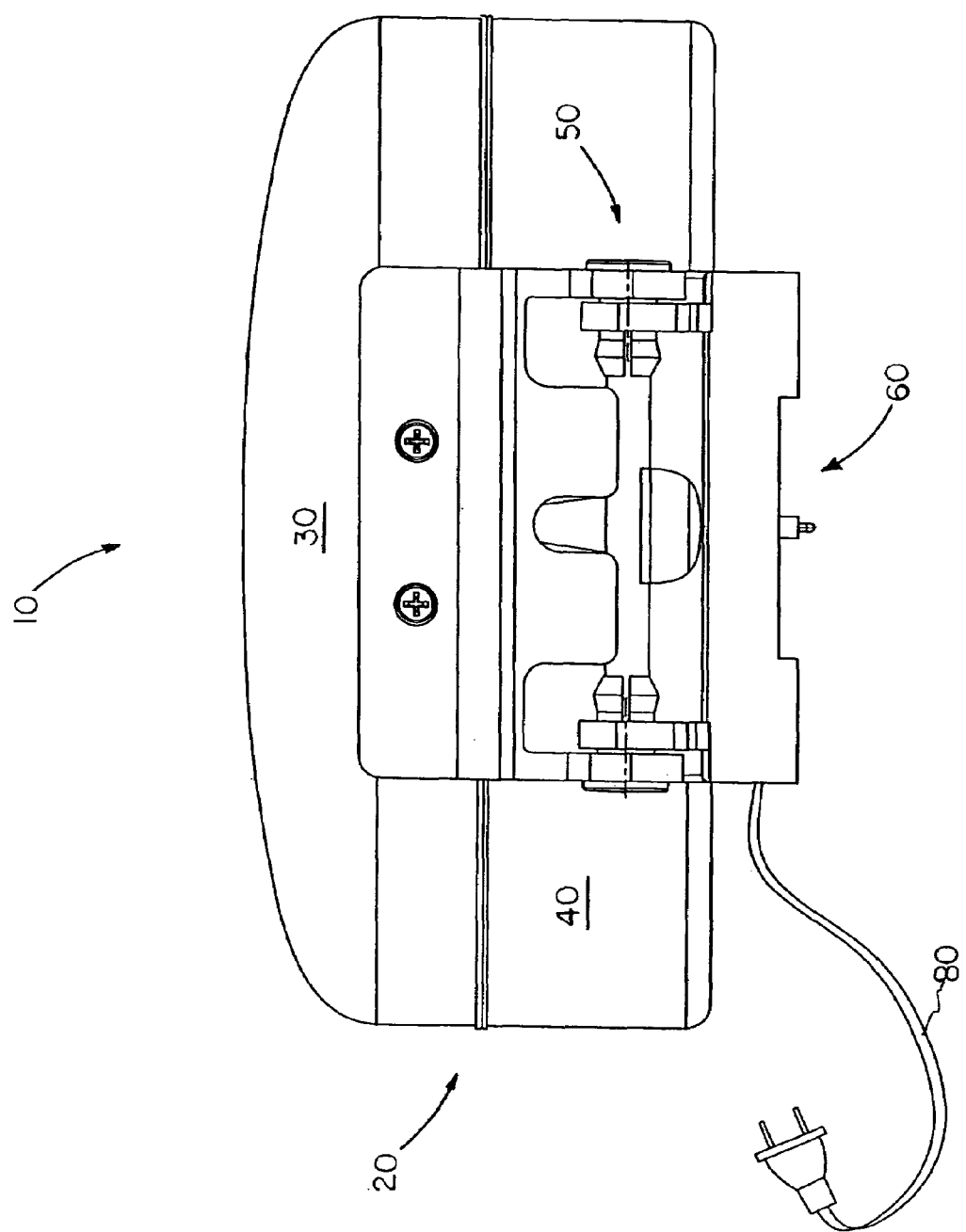
FIG. 3 is a rear end view of the present muffin maker showing further details thereof including the hinge mechanism.

The lid member 30 and the lower housing section 40 are provided with interconnecting means, including but not limited to, the following structures. In the embodiment shown the lid member 30 and the lower housing section 40 are interconnected by a pivoting hinge mechanism, indicated generally at 50 as more clearly shown in FIGS. 2 and 3.

The housing assembly 20 is mounted on a base support plate, indicated generally at 60, whereon a temperature selector switch 65 is disposed in relation to numerical indicia 62 (FIG. 1A) for temperature regulation. A power ON/OFF indicator light 61 is also provided on the base support plate 60. In operation the automatic muffin maker 10 is electrically connected to a standard 110 volt power source by power cord 80.

Figure 4:
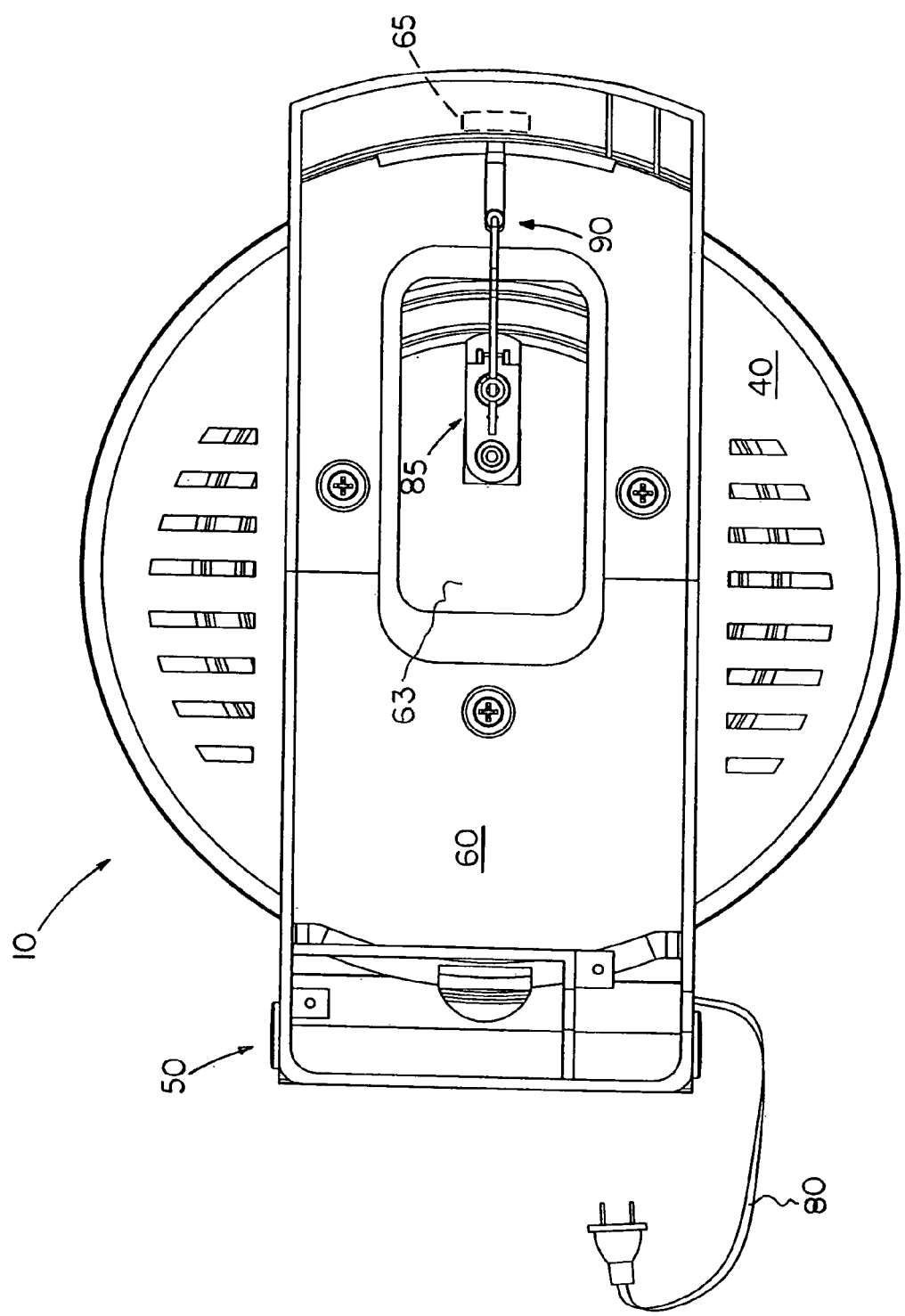
FIG. 4 is a bottom view of the present muffin maker showing further details of the construction thereof including the temperature controller.

Referring to FIG. 4 it can be seen that the temperature selector switch 65 is coupled to a temperature controller or thermostat, indicated generally at 85, by a mechanical linkage, indicated generally at 90, which is disposed beneath the base plate 60. The linkage mechanism 90 extends through an opening 63 formed in base plate 60.

The housing assembly 20 is constructed of sheet steel, engineered composites, or other heat resistant materials and is provided in different exterior finishes such as powder coating, stainless steel, or plated steel.

Figure 5:
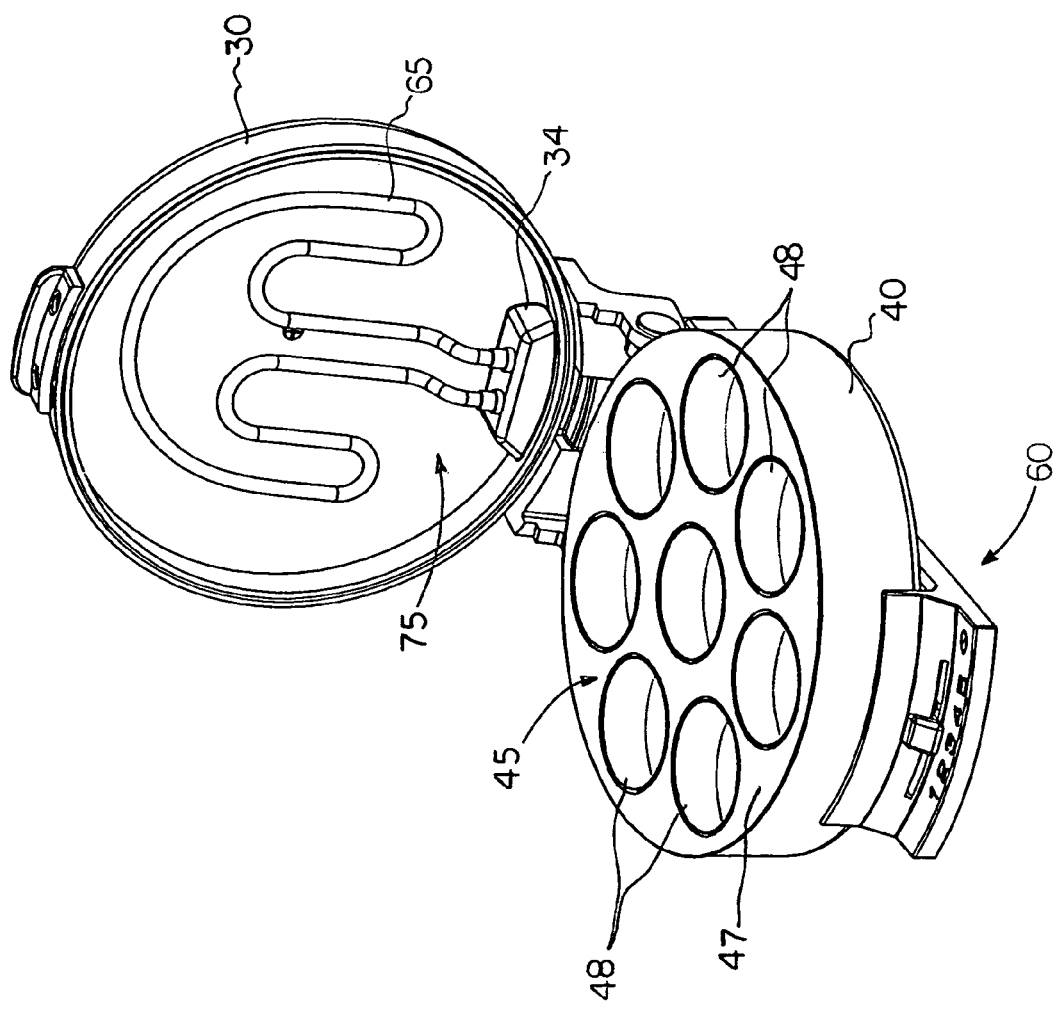
FIG. 5 is a perspective view of the present muffin maker showing the top browning assembly within the lid member and the heating mold assembly within the lower housing.

Referring to FIG. 5 the present muffin maker 10 provides structures comprising heating means including, but not limited to, the following structures. It can be seen that the lid member 30 includes a top browning assembly, indicated generally at 75, which is for browning (i.e. to scorch slightly in cooking). The lower housing section 40 encloses a heating mold assembly, indicated generally at 45, including a baking pan or liner 47 wherein a plurality of tapered cylindrical mold cups 46 are formed as shown.

In the embodiment shown the heating mold assembly 45 also includes a generally cylindrical heating plate 42 (FIG. 6) wherein a tubular resistance heating element 70 (FIG. 8) is integrated. The heating element 70 is constructed of stainless steel tubing or other suitable tubing wherein a resistance heater wire 72 (FIG. 9) is enclosed. A tubular resistance heating element 70 of the type sold under the tradename CALROD or other similar heating element is suitable for this purpose.

Figure 6:
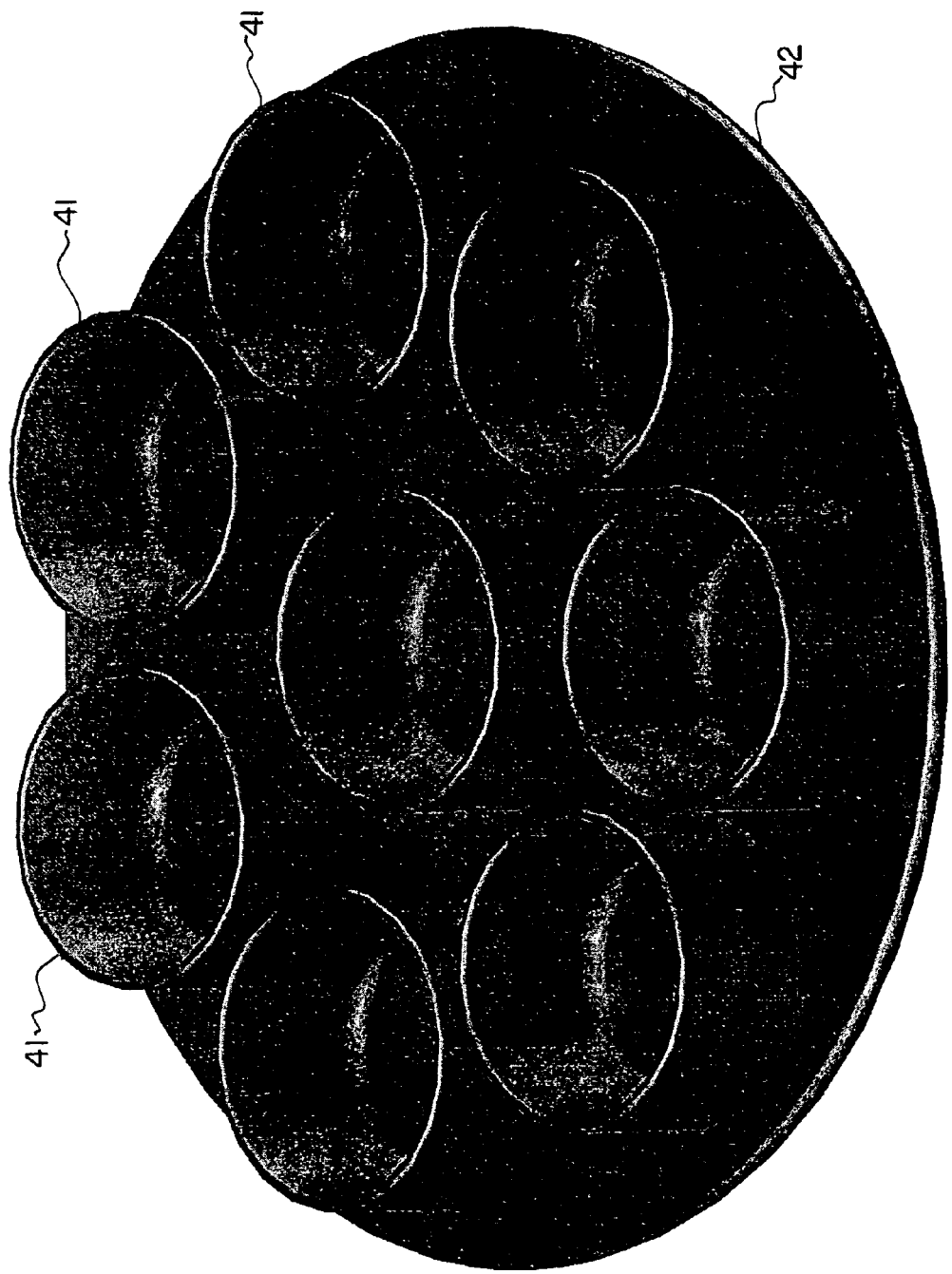
FIG. 6 is a perspective view of the heating plate of the present muffin maker.

As shown more clearly in FIG. 6 heating plate 42 includes a plurality of internally tapered, cylindrical heating wells 41, which are integrally cast in the heating plate 42 in a circular pattern about a central well 41. In the embodiment shown eight heating wells 41 are provided. The heating plate 42 is constructed from cast aluminum, cast iron, steel, or other suitable material having a high coefficient of heat conductivity.

Figure 7:
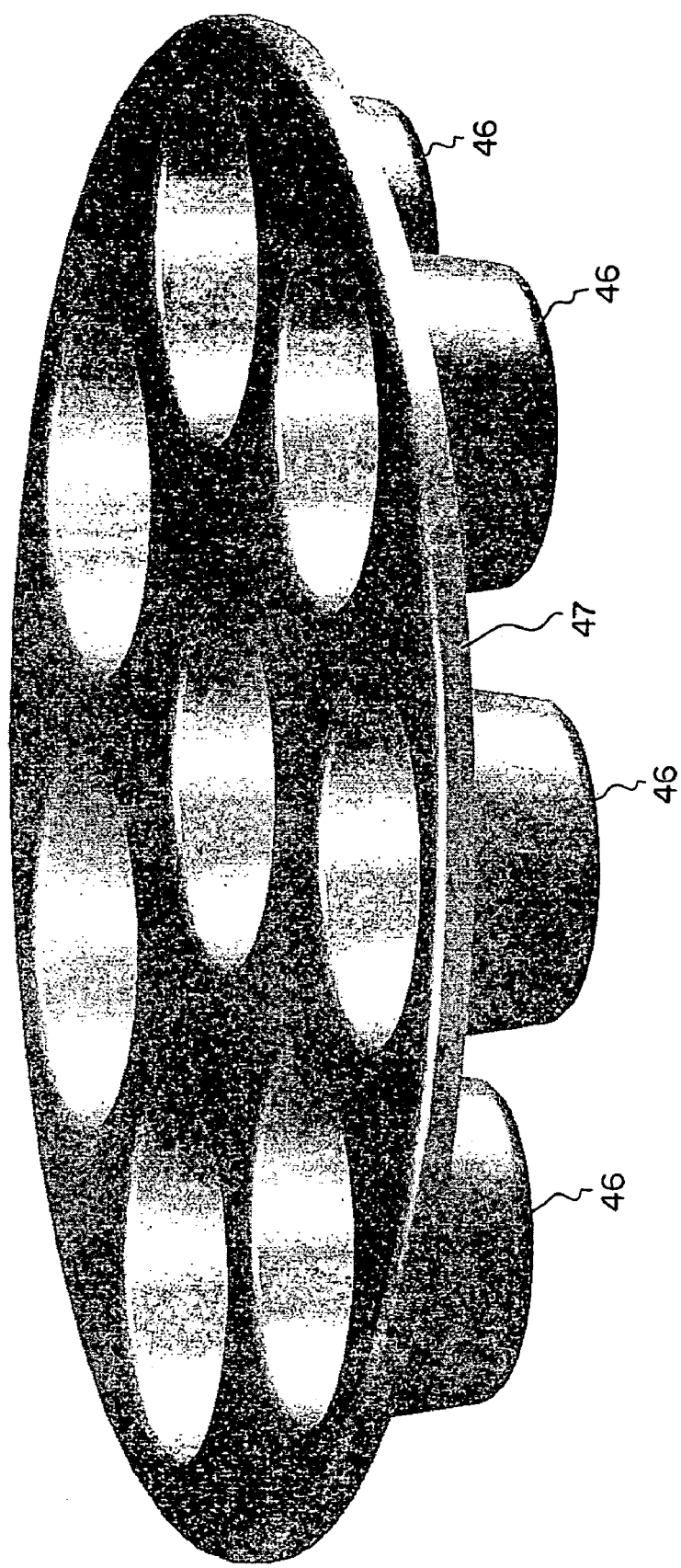
FIG. 7 is a perspective view of the baking liner of the present muffin maker.

As shown in FIG. 7 the baking pan or liner 47 is also constructed from a highly heat conductive material such as sheet aluminum, steel, or other suitable material and may be provided with a non-stick coating. The liner 47 is removable from the heating plate 42 for cleaning purposes and/or replacement.

Figure 8:
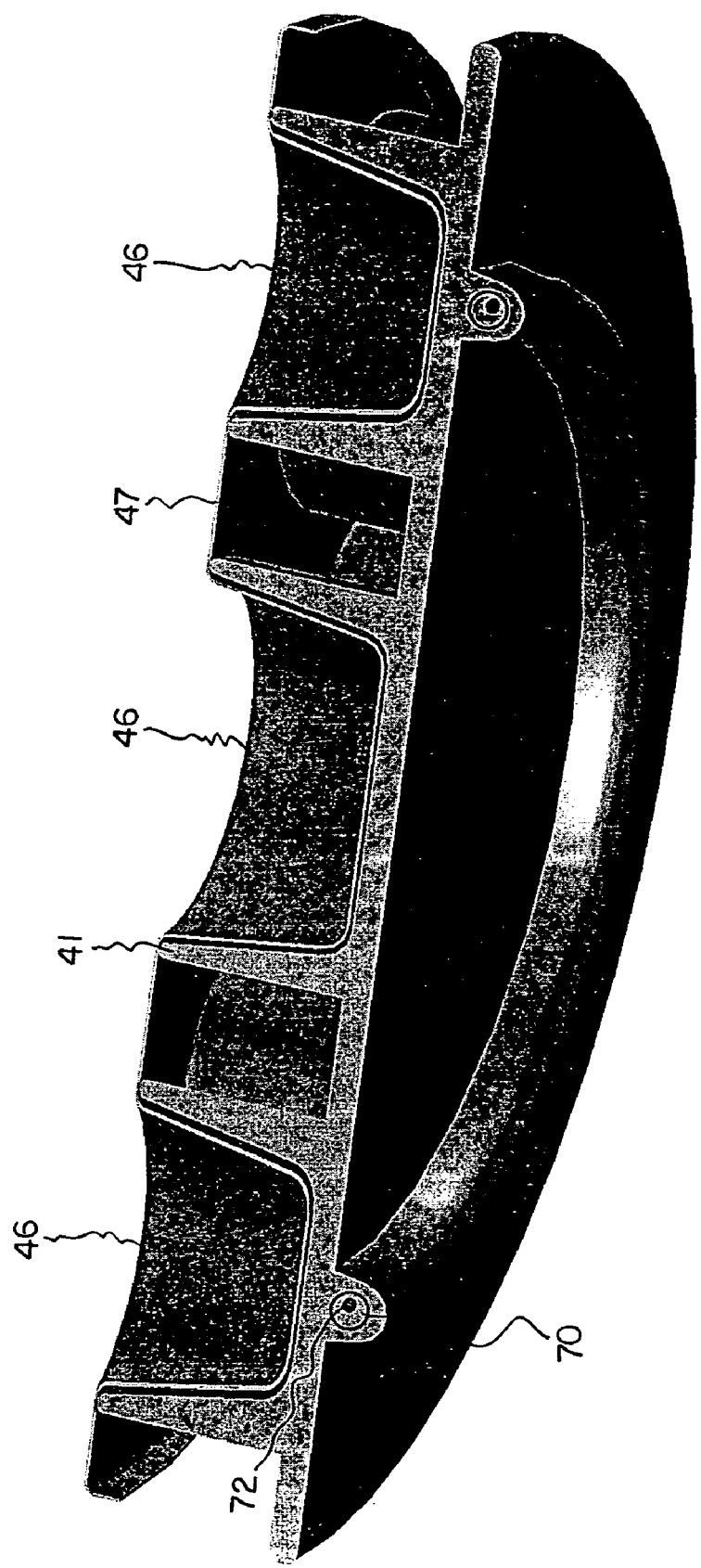
FIG. 8 is a partially cutaway perspective view showing the baking liner assembled within the heating plate.

Advantageously, the liner 47 including tapered mold cups 46 is configured to provide a complementary surface for mating engagement within the heating wells 41 of the heating plate 42 to maximize heat transfer therebetween as illustrated in FIG. 8. More particularly, when the liner 47 is inserted into the mating heating plate 42 as shown in FIG. 8, the tapered mold cups 46 of the liner are effectively interlocked in engagement within their corresponding heating wells 41 providing surface-to-surface contact therebetween for efficient heat transfer to the cups 46 wherein the muffins or other foodstuffs are baked.

Figure 9:
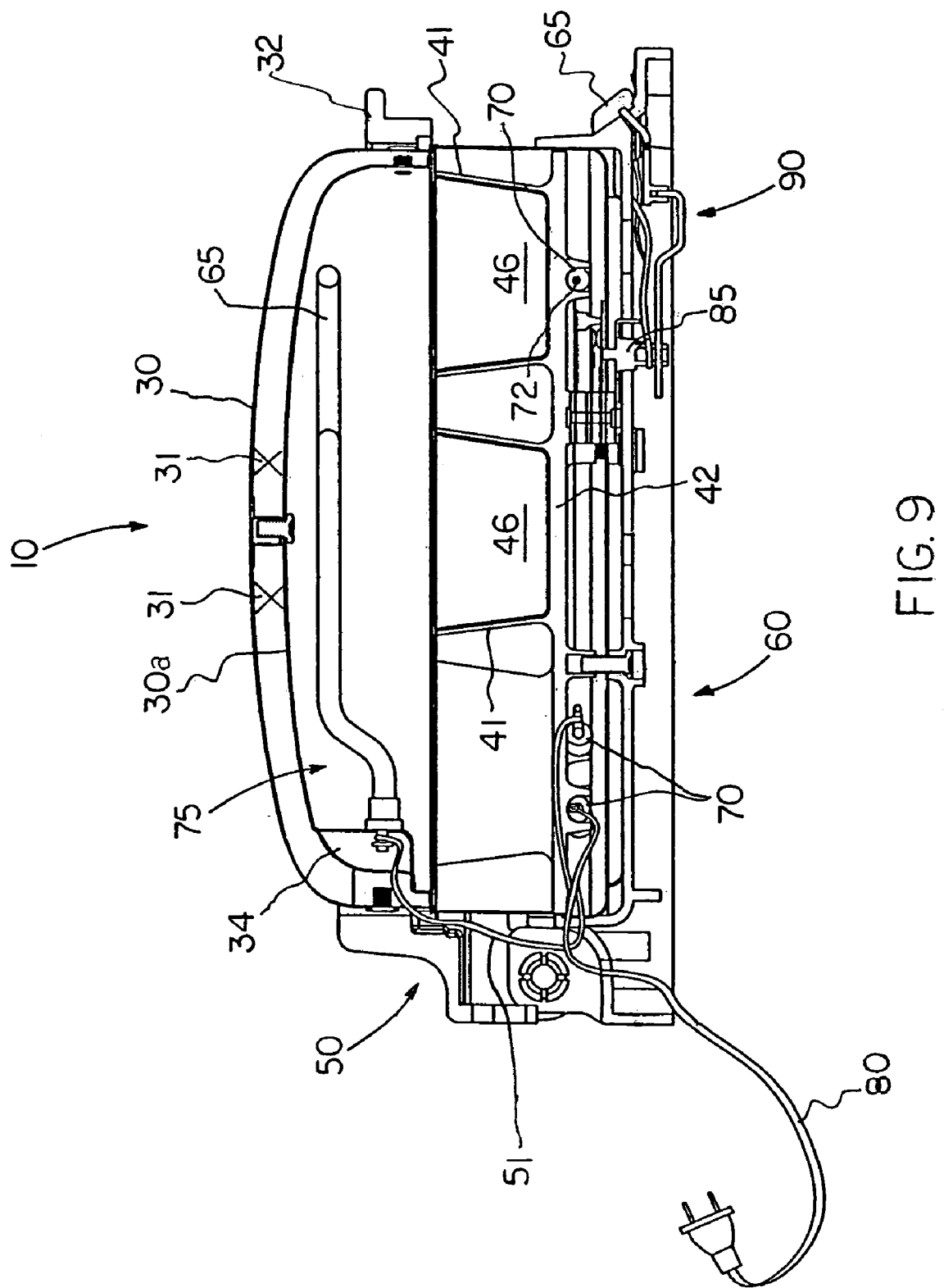
FIG. 9 is a cross-sectional view of the present muffin maker taken along section line 9-9 of FIG. 1B.

Referring to FIG. 9, further details of the construction of the present muffin maker 10 are illustrated. The top browning assembly 75 includes a top heating element 65 which is mounted on an insulating block 34 attached to the interior surface 30a of the upper housing section 30. The upper housing section is provided with heat insulating materials disposed as at 31 to reduce heat at the exterior of the housing for the protection of the user.

Top browning element 65 is a symmetrical, bilobular construction formed in a generally umbrella-shaped configuration (i.e. wherein such umbrella is viewed in axial cross-section) as shown in FIG. 5. Top browning element 65 extends from the insulating block 34 in parallel relation to the top surface of the baking pan 47 to provide uniform browning of the muffins in operation. A tubular resistance heating element 70 of the type sold under the tradename CALROD or other similar heating element is also suitable for this purpose.

In other embodiments (not shown) the top browning assembly may include a quartz heating element or, alternatively, an infrared heating element which are commercially available for small cooking appliances. Thus, the embodiment disclosed herein is intended to be illustrative and not restrictive in any sense.

The automatic muffin maker 10 provides structures comprising temperature controlling means including, but not limited to, the following structures. The top browning element 65 is electrically connected to a temperature controller 85 and, in turn, to a power source by electrical wiring routed through the hinge mechanism 50 as shown in FIG. 9. The temperature controller 85 is constructed to provide a timed heating cycle for baking and regulates the functions of the present muffin maker 10.

Temperature controller 85 is electrically interconnected by wiring to both the base heating element 70 and top browning element 65 and functions to regulate the operation thereof. In the embodiment shown the temperature controller 85 comprises a thermostat.

In another embodiment (not shown) the muffin maker is provided with electronic controls including a digital control panel to regulate the operation thereof. In the embodiment using electronic controls a timed cooking cycle is selected by the user which reverts to a warming mode upon completion of the cooking cycle.

Figure 10:
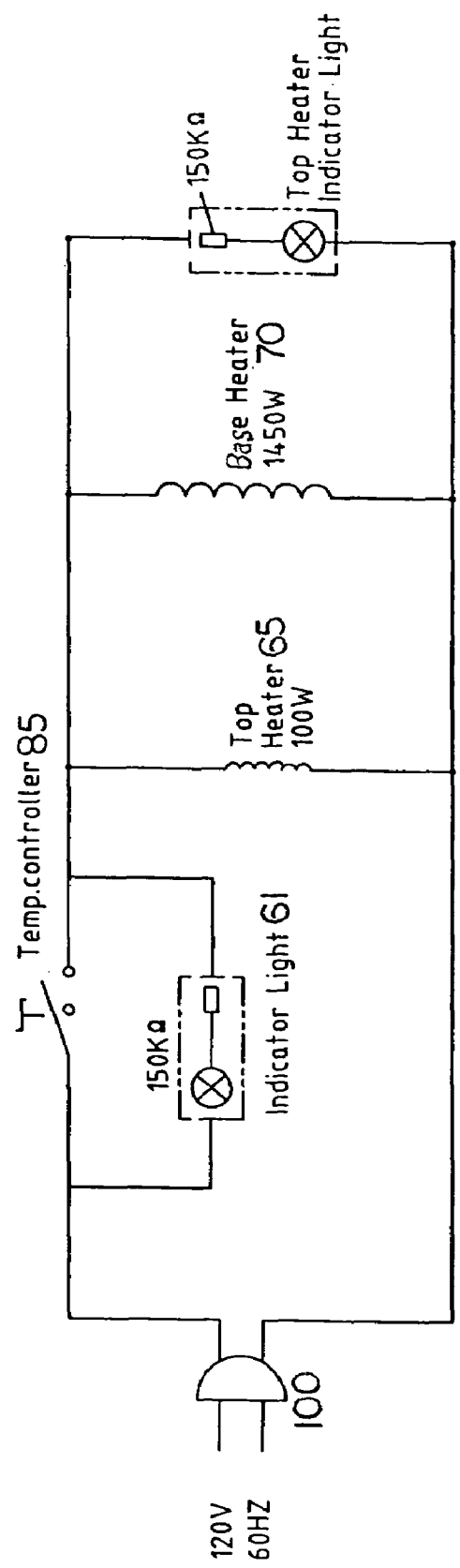
FIG. 10 is an electrical schematic showing the components and circuitry of the present muffin maker.

Referring to FIG. 10 there is shown therein a schematic representation of the electrical components and circuitry of the present muffin maker 10 including the temperature controller 85, heating elements 65 and 70, and the associated circuitry and components shown in FIG. 9. The muffin maker 10 is designed as a home appliance for use with a standard 120 volt, 60 Hz power source 100.

In the embodiment shown the top browning element 65 element 40 is designed to operate in the range of 100 watts; and the base heating element 70 is designed to operate in the range of 1450 watts. Of course, these wattage ratings may vary for a given application and capacity of the muffin maker 10.

In operation the mold cups 46 within the baking liner 47 are filled with the desired batter for a particular foodstuff. It is understood that the principles of the invention may be applied to form any type of muffin, bread, or other type of baked foodstuff of this general shape.

Next, the temperature selector switch 65 is set to the desired temperature cycle using indicia 62 and the muffin maker 10 is plugged into a standard electrical 110 volt outlet to initiate the baking cycle. Indicator light 61 provides a warning to the user that the heating elements 65, 70 are energized. The muffin maker 10 shuts off automatically at the end of the selected baking cycle.

In an alternative embodiment (not shown) the lid member 30 is provided with electrically conductive interconnecting means including, but not limited to, the following structures. The top heating element 65 is electrically connected to the power source by a pin connector (not shown), which is attached by electrical wiring 51 to an electrical plug assembly (not shown) integrated within a modified hinge mechanism.

Electrical wiring 51 extends through the hinge mechanism to the power cord 80, which extends from the housing 40. An electrical circuit for the top heating element 65 is completed at an electrical contact (not shown) when the hinge mechanism is in the closed position. A compression spring (not shown) maintains the electrical connection when the lid member 30 is in the closed position.

In another embodiment a tubular type (e.g. Cal-rod) element 65 is mounted on the inner surface of the lid member 30. In this embodiment (not shown) the lid member 30 is fabricated from a heatproof glass material. The browning element 65 extends through the lid member 30 within an insulating block and terminates in a plug connector (not shown). The plug connector is received in an electrical receptacle, which is integrated into the modified hinge mechanism. Thus, the top browning element 65 is electrically connected to the power source via power cord 80 and electrical wiring 51. Advantageously, the plug and receptacle may be disconnected for food service, cleaning, and storage purposes.

In yet another embodiment (not shown) a tubular type browning element extends through the lid member 30 within a modified insulating block and terminates in a right angle plug connector. A cover plate encloses the modified insulating block and the plug connector.

Plug connector is received in an electrical receptacle, which includes a permanent magnet block. Magnet block engages and retains plug connector at the interface thereof to maintain electrical contact with the top browning element and to secure the lid member 30 in position on the muffin maker. The plug connector and receptacle may be conveniently disconnected for food service, cleaning, and storage purposes.

Although not specifically illustrated in the drawings, it should be understood that additional equipment and structural components will be provided as necessary and that all of the components described above are arranged and supported in an appropriate fashion to form a complete and operative Automatic Muffin Maker incorporating features of the present invention.

Moreover, although illustrative embodiments of the invention have been described, a latitude of modification, change, and substitution is intended in the foregoing disclosure, and in certain instances some features of the invention will be employed without a corresponding use of other features. Accordingly, it is appropriate that the appended claims be construed broadly and in a manner consistent with the scope of invention.

What is claimed is:

1. An automatic muffin maker comprising:
   a base support plate;
   a housing assembly attached to said base support plate including an upper housing section and a lower housing section interconnected by a hinge mechanism;
   heating means including a top browning element disposed within said upper housing section, said top browning element comprising a tubular resistance heating element, wherein said tubular resistance heating element is a symmetrical bilobular construction resembling an umbrella in axial cross-section, and a heating plate including a base heating element disposed within said lower housing section, wherein said heating plate further includes a plurality of individual heating wells integrally formed thereon in a predetermined pattern;
   a baking liner including a plurality of molds formed therein in said predetermined pattern, wherein said molds are positioned in surface-to-surface contact within said heating wells; and
   temperature controlling means electrically interconnected with said heating means enabling said heating elements to be energized to provide variable baking cycles.

2. The automatic muffin maker of claim 1 wherein said base support plate includes a temperature selector switch coupled to said temperature controlling means by a mechanical linkage.

3. The automatic muffin maker of claim 2 wherein said temperature controlling means comprises a thermostat.

4. The automatic muffin maker of claim 1 wherein said heating plate includes a tubular resistance heating element integrated therein.

5. The automatic muffin maker of claim 4 wherein each of said plurality of individual heating wells comprises an internally tapered cylindrical structure.

6. The automatic muffin maker of claim 1 wherein each of said plurality of molds in said liner comprises a mating inwardly tapered cylindrical structure, said molds being disposed in said predetermined pattern such that said molds are interlocked within said heating wells to provide efficient heat transfer therebetween.

7. The automatic muffin maker of claim 1 wherein said redetermined pattern comprises eight heating wells and eight molds arranged in a generally circular pattern about a center well and a center mold respectively.

8. The automatic muffin maker of claim 1 further including a power indicator light electrically interconnected to said heating elements.

9. An appliance for baking foodstuffs comprising:
   a housing assembly having a base support plate, wherein said housing assembly includes a lower housing section and a lid member interconnected by a hinge mechanism;
   a top heating element mounted within said lid member, said top heating element comprising a tubular resistance heating element, wherein said tubular resistance heating element is a symmetrical bilobular construction resembling an umbrella in axial cross-section;
   a bottom heating plate including an integrated heating element disposed within said lower housing section, wherein said bottom heating plate further includes a plurality of individual heating wells integrally formed thereon in a predetermined pattern;
   a baking liner including a plurality of molds formed therein for receiving batter, wherein said liner is nested in surface-to-surface contact within said heating wells; and
   a thermostat electrically interconnected with said heating elements enabling said top heating element and said integrated heating element to be energized to provide variable baking cycles.

10. The appliance of claim 9 wherein said appliance includes a temperature selector switch coupled to said thermostat by a mechanical linkage.

11. The appliance of claim 9 wherein said heating plate includes a tubular resistance heating element embedded therein.

12. The appliance of claim 11 wherein each of said plurality of individual heating wells comprises an internally tapered cylindrical structure.

13. The appliance of claim 12 wherein each of said plurality of molds in said liner comprises a mating inwardly tapered cylindrical structure, said molds being disposed in said predetermined pattern such that said molds are interlocked within said heating wells to provide efficient heat transfer therebetween.

14. The appliance of claim 9 wherein said predetermined pattern comprises eight heating wells and eight muffin molds arranged in a generally circular pattern about a central well and a central mold respectively.

15. The automatic muffin maker of claim 9 further including a power indicator light electrically interconnected to said heating elements.

* * * * *